Patented Jan. 31, 1928.

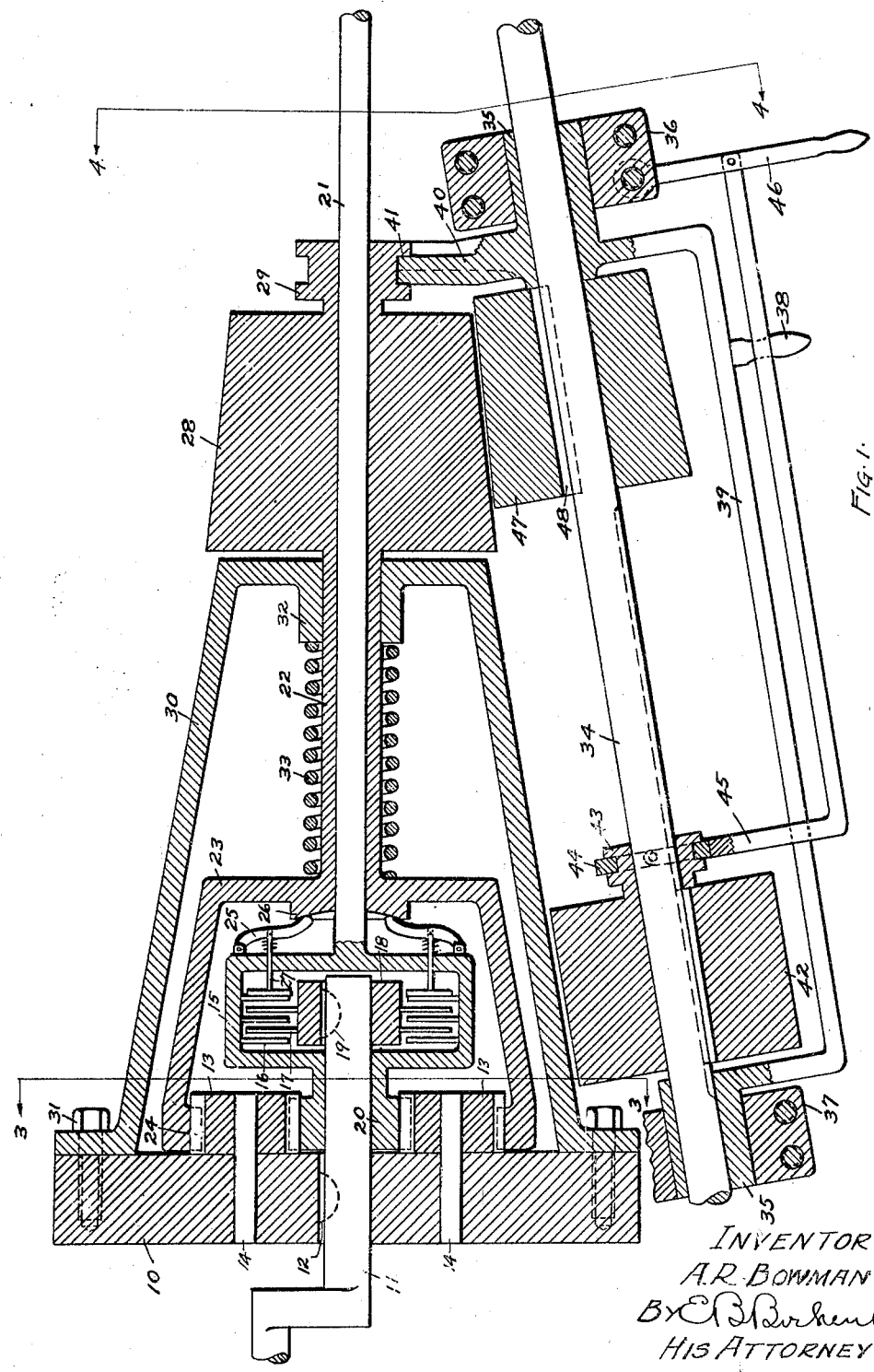

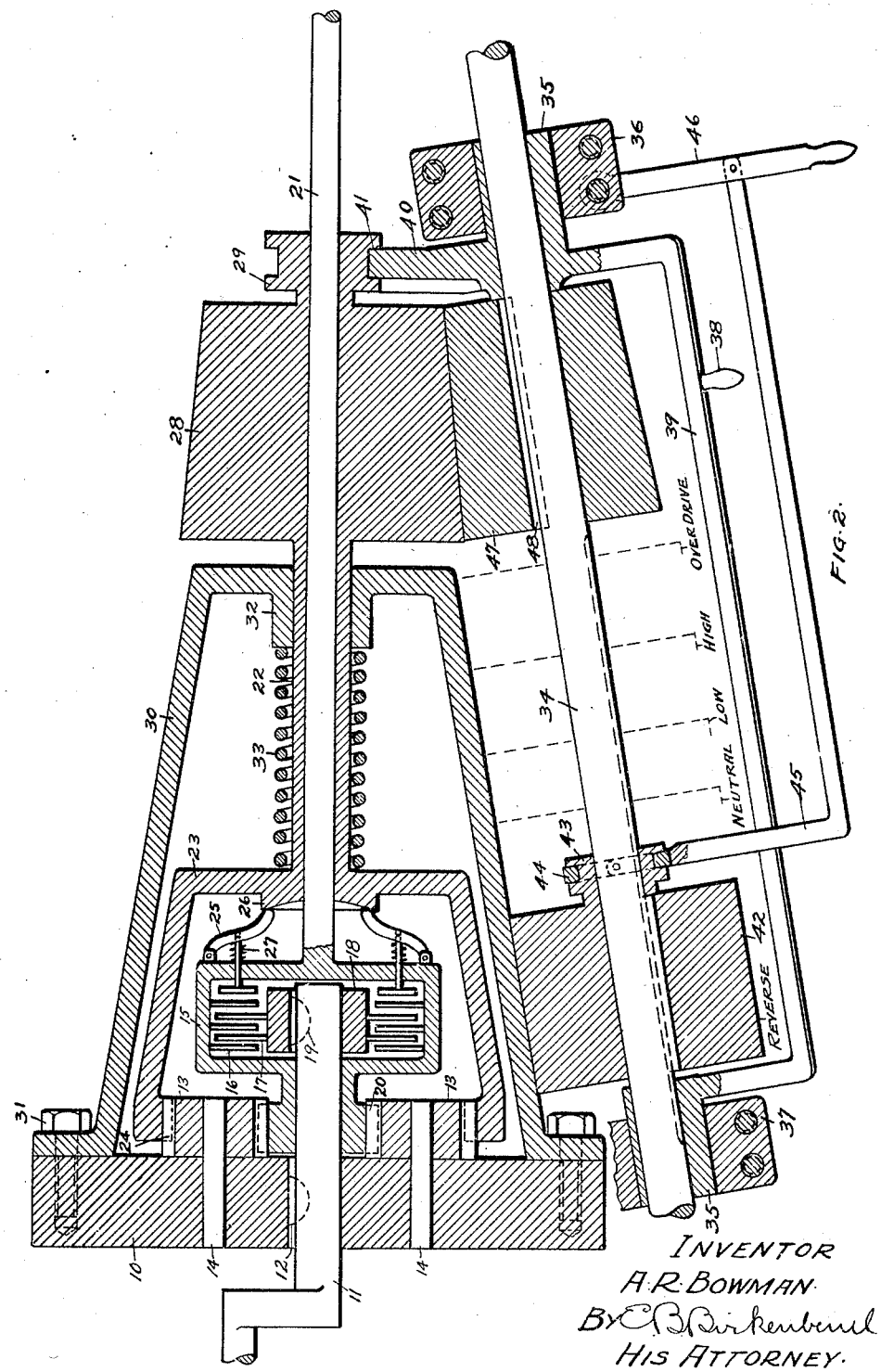

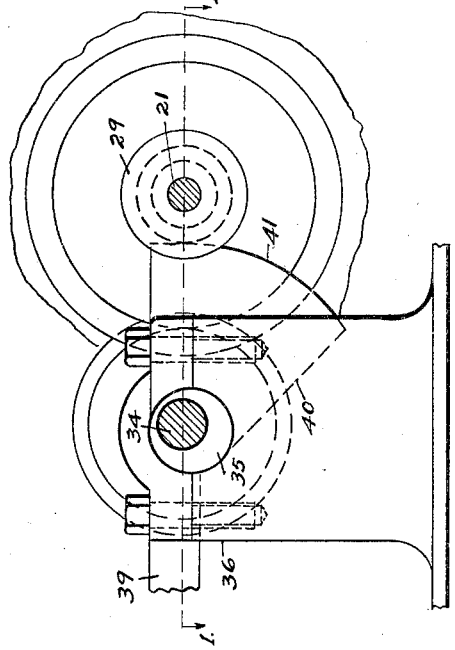
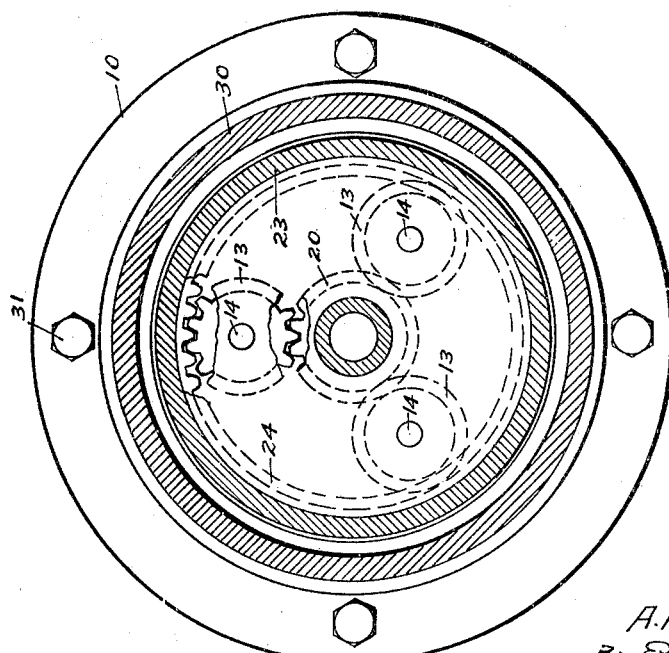

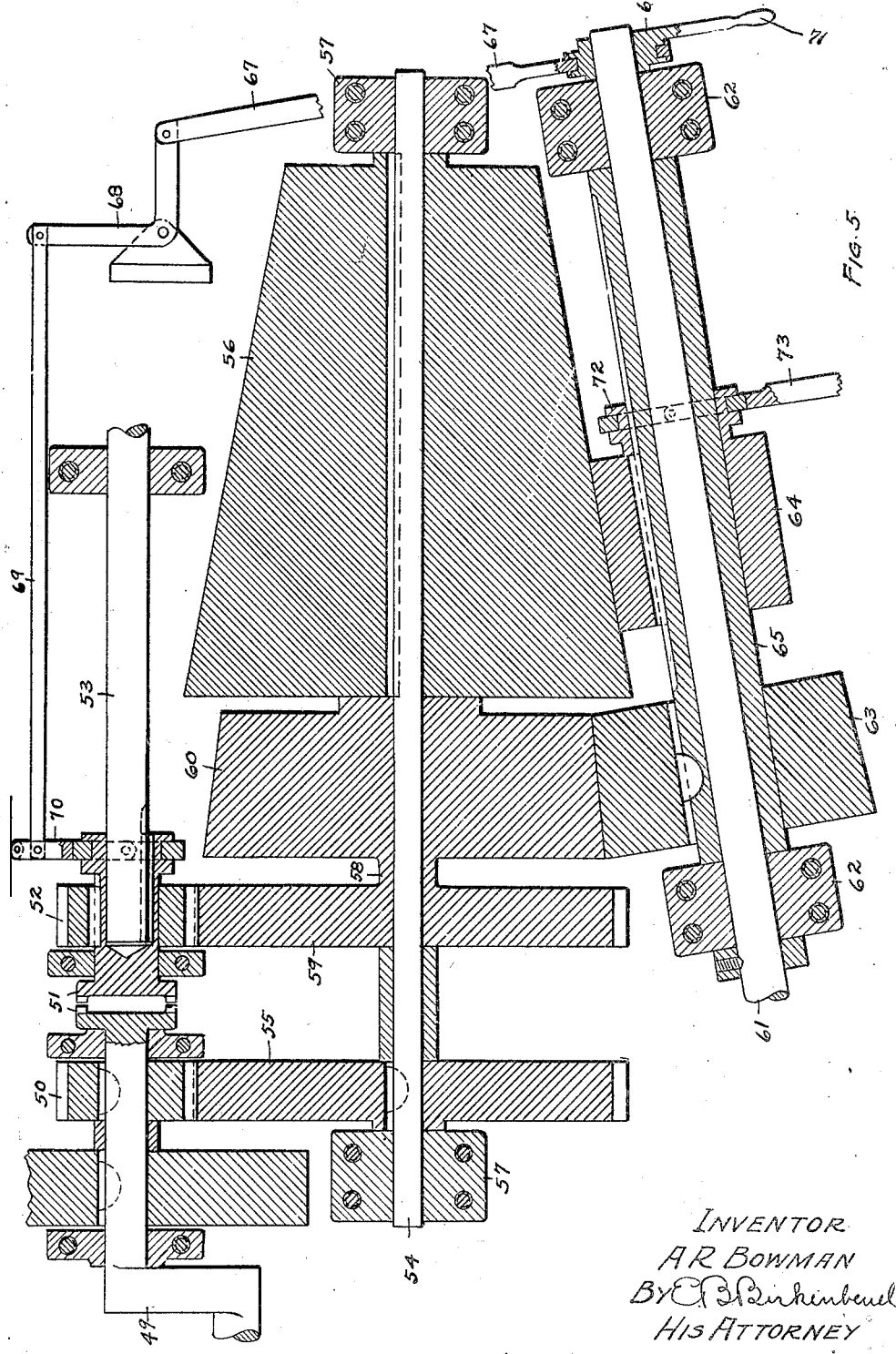

1,657,991

UNITED STATES PATENT OFFICE.

ARTHUR R. BOWMAN, OF PRINEVILLE, OREGON.

TRANSMISSION FOR AUTOMOBILES.

Application filed December 8, 1924. Serial No. 754,688.

This invention relates generally to automobiles and particularly to variable speed devices in transmissions.

The first object of this invention is to provide an exceedingly simple and efficient means whereby various speeds can be attained gradually.

The second object is to employ a sliding friction to control the changes in speeds in a manner that the device is operating most efficiently at the moment of greatest load instead of the reverse, as is the case where the ordinary friction disk is employed wherein the friction pinion runs in a radial direction compared with the disk.

The third object is to permit the employment of a planetary system without the necessity of the usual limitation in the number of speeds obtainable.

These and other objects will become more apparent from the specification following as illustrated in the accompanying drawings, in which:

Figure 1 is a horizontal section through the device showing the parts in the position for a direct drive. Figure 2 is a similar view showing five of the possible positions which the parts can assume when the transmission is in reverse, neutral, low, high and overdrive positions. Figure 3 is a section taken along the line 3—3 in Figure 1. Figure 4 is a sectional view taken along the line 4—4 in Figure 1. Figure 5 is a horizontal section through a modified form of the device wherein the planetary system is not employed.

Similar numbers of reference refer to the same parts throughout the several views.

Referring in detail to the drawings, I have illustrated somewhat diagrammatically the usual fly wheel 10 and crank shaft 11 on which the fly wheel is secured by the key 12. The planetary pinions 13 are mounted on the studs 14 in the fly wheel 10.

Over the end of the shaft 11 is placed a clutch housing 15 whose disks 16 can engage the disks 17 of the hub 18, which is joined by the key 19 to the shaft 11. A gear 20 is formed integral with the clutch housing 15 and meshes with the pinions 13 at all times. To one side of the housing 15 is joined a main or propeller shaft 21. On the propeller shaft 21 is mounted a sleeve 22, on one end of which is formed a gear housing 23 which has formed on its open end an internal gear 24 which slidably meshes with the pinions 13. The clutch housing 15 is provided with arms 25 which engage the hub 26 in the housing 23, and through the plungers 27 can engage the clutch disks 16 and 17 in the customary manner.

On the opposite end of the sleeve 22 is placed a conical friction wheel 28 which is provided on its outer end with a flanged collar 29. A friction cone 30 is joined to the fly wheel 10 by means of the bolts 31 and bears on the sleeve 22 in the hub 32. A spring 33 is placed on the sleeve 22 between the housing 23 and the hub 32.

Alongside of the device just described is mounted a countershaft 34 in the eccentric bushings 35 which are supported by the standards 36 and 37. A lever 38 on the cross bar 39 is joined to both of the bushings 35 and is adapted to rock same in a manner to move the shaft 34 laterally.

On one of the bushings 35 is formed an arm 40 having a cam-shaped outer edge 41 which engages the collar 29 between its flanges in a manner so that when the bushings 35 are rocked that they will impart longitudinal motion to the collar 29 and the parts attached thereto.

On the shaft 34 is splined a friction wheel 42 which is provided with a flanged hub 43, whose collar 44 is joined to the connecting rod 45 on the lever 46, which, for the purpose of illustration, is shown mounted on the standards 36.

Also mounted on the shaft 34 is the friction wheel 47 which is held in place against rotation by means of the key 48. It will be understood that the wheel 47 does not slide on the shaft 34. In some instances it may be preferable to dispense with the cross bar 39 and substitute a sleeve which will unite the bushings 35.

Turning now to the modification shown in Figure 5, there is illustrated the usual crank shaft 49 on whose end is placed a pinion 50 which can be connected through the jaw clutch 51 to the pinion 52 on the propeller shaft 53. Parallel with the shaft 49 is an intermediate shaft 54 on one end of which is secured a gear 55 which meshes with the pinion 50 at all times, and at the other end of which is secured a beveled friction wheel 56. Suitable bearings 57 are provided for the shaft 54. On the shaft 54 is placed a sleeve 58 on which is secured a gear 59 which meshes with the pinion 52 at all times, and also the friction wheel 60.

A countershaft 61 mounted in the bearings 62 is placed at an angle to the shaft 54 and has mounted thereon a fixed friction wheel 63 and a sliding friction wheel 64. The shaft 61 is eccentric and does not rotate, but the sleeve 65 on the shaft 61 does rotate and carries the wheels 63 and 64. It will also be understood that the wheel 63 is rigidly attached to the sleeve 65, and that the wheel 64 is splined on the sleeve 65 and can slide thereon.

An eccentric 66 on the shaft 61 is provided with a connecting rod 67 which is joined to the bell crank lever 68, which, in turn actuates the connecting rod 69 which is joined to the clutch shifting lever 70.

For the purpose of illustration a lever 71 is placed on the shaft 61 in order to rock same, in a manner to move the wheels 63 and 64 in and out of engagement with the wheels 56 and 60. A flanged hub 72 is provided on the sleeve 65, and a conventional lever 73 is used to supply a sliding motion to the wheel 64.

The operation of the device as illustrated in the first four figures of the drawings is as follows: Motion from the crank shaft 11 is transmitted through the disks 16 and 17 directly to the shaft 21 in order to secure a direct drive. If, however, it is desired to shift to any other speed, the lever 38 is moved in a manner to bring the friction wheels 42 and 47 into engagement with the cone 30 and the wheel 28. The operation of the lever 46 will cause the wheel 42 to slide into one of the positions shown in Figure 2, or some intermediate position, and, through the movement of the arm 40, disengage the disks 16 and 17 of the direct drive clutch. The cone 30 will now rotate the wheel 42 to a speed which is entirely dependent upon the longitudinal position of the wheel 42.

This rotation is now transmitted through the shaft 34 to the wheel 47, which, in turn, transmits same to the wheel 28, and this rotative effect is finally delivered to the internal gear 24. The fly wheel 10 is now carrying the pinions 13 around the shaft 11, and it is evident that the speed at which these pinions rotate depends entirely upon the relative speed of the internal gear 24; and it is also evident that not only is the speed of the pinions 13 thereby controlled, but also their actual direction of rotation.

Therefore at moments of greatest load, the cone 30 and the wheel 42 are in their most favorable relation. After high speed has been attained and the direct drive is employed through the clutch, the friction wheels are disengaged and remain so all of the time that the direct drive is employed. In one sense of the word, the friction wheels are employed only to control the motion of the planetary, rather than actually taking part in the drive, although, of course, this means that the power is actually transmitted through these friction wheels at various times, but these are made sufficiently large for this purpose. In actual practice it may be necessary to employ two or more of the shafts 34 with the accompanying friction wheels to increase the driving capacity of the device, which, of course, will not depart from the spirit of this invention. This feature has not been illustrated, in order to simplify the explanation of the device.

Turning now to the modification shown in Figure 5, the operation is briefly described as follows: When employing the direct drive, the lever 71 is so positioned as to hold the wheels 63 and 64 out of engagement with the wheels 56 and 60 and at the same time to engage the clutch 51 which unites the shafts 49 and 53.

When desiring to change speed, the lever 71 is moved in a manner to disengage the clutch 51 and to engage the friction wheels just mentioned. Any movement of the lever 73 will cause the wheel 64 to slide along the wheel 56, which, being positively driven through the gear 55 from the crank shaft 49 transmits a proportional speed to the wheel 63, which, in turn, through the wheel 60, drives the gear 59 which meshes with the pinion 52 on the shaft 53 which has been separated from the shaft 49.

While these two modifications are seemingly different, their application is practically the same except that the planetary is not employed.

It will also be understood that the position of the sliding member 42 need not be on the shaft 34, but may be mounted on the axis of the drive shaft on the sleeve 22, in which instance that member which now corresponds with the member 28 would be made to slide, while the members 42 would be held against sliding.

The advantage of this construction would be that only one sliding member would need to be moved in case a number of the members 42 were being employed.

I am aware that many forms of transmissions for automobiles have been invented in the past. I therefore do not intend to cover this device broadly but to include all forms and modifications that fall fairly within the appended claims.

I claim:

1. In an automobile transmission, the combination of a drive shaft; planetary pinions mounted on said drive shaft; a clutch rotatably mounted on said drive shaft; a gear on said clutch meshing with said pinions; a driven shaft attached to said clutch; an internal gear rotatably mounted on said drive shaft and meshing with said pinions; a friction wheel attached to said gear; and a variable speed friction drive between said drive shaft and said friction wheel adapted to be disengaged when said clutch unites said drive and driven shafts.

2. In an automobile transmission, the combination of a drive shaft; a fly wheel on said drive shaft; planetary pinions mounted on said fly wheel; a gear loose on said shaft and meshing with said pinions; a clutch attached to said gear adapted to lock same to said shaft; a driven shaft joined to said clutch; a slidable sleeve on said driven shaft; a housing on said sleeve enclosing said clutch; an internal gear formed in said housing slidably meshing with said planetary pinions; a friction wheel on the opposite end of said sleeve; a conical housing on said fly wheel; an eccentrically mounted countershaft alongside of said driven shaft; a slidable friction wheel on said countershaft engageable with said conical housing; a friction wheel secured on said countershaft engageable with said friction wheel on said internal gear-carrying sleeve; and means for disengaging the wheels on said countershaft from the friction elements on said driven shaft when said shafts are joined by said clutch.

3. In an automobile transmission, the combination of a drive shaft; planetary pinions mounted on said drive shaft; a loose gear on said drive shaft meshing with said pinions; a clutch between said drive shaft and gear; a driven shaft attached to said gear; an internal gear around said pinions; a friction wheel attached to said internal gear, said friction wheel being slidably mounted in a manner to control said clutch; a countershaft alongside of said driven shaft; a variable speed friction drive between said drive shaft and said countershaft; driving connections between said countershaft and said internal gear driving wheel, said countershaft having eccentric bearings adapted to permit same to be moved toward or away from said driving shaft; and a cam arm on said eccentric bearing arranged to disengage said clutch when said friction wheels are engaged.

4. In an automobile transmission, the combination of a drive shaft; a fly wheel on said drive shaft; planetary pinions on said fly wheel; a driven shaft; a clutch between said drive and driven shafts; a gear meshing with said planetary pinions and mounted on said drive shaft; a sleeve on said drive shaft; an internal gear on one end of said sleeve meshing with said pinions, said sleeve having a clutch-engaging face formed thereon; a conical housing attached to said fly wheel and supporting said sleeve; a conical friction wheel on the end of said sleeve which projects from said conical housing; a spring between said sleeve and said conical housing; a countershaft alongside of and converging with said driven shaft; a sliding friction wheel splined on said countershaft opposite said conical housing; a second friction wheel secured on said countershaft opposite the friction wheel on said sleeve; means for moving the wheels on said countershaft into engagement with the friction elements on the drive and driven shafts; and lever means for sliding said slidable wheel on said countershaft into the desired position alongside of said conical housing and to simultaneously disengage said clutch.

ARTHUR R. BOWMAN.